Figures 1, 2:
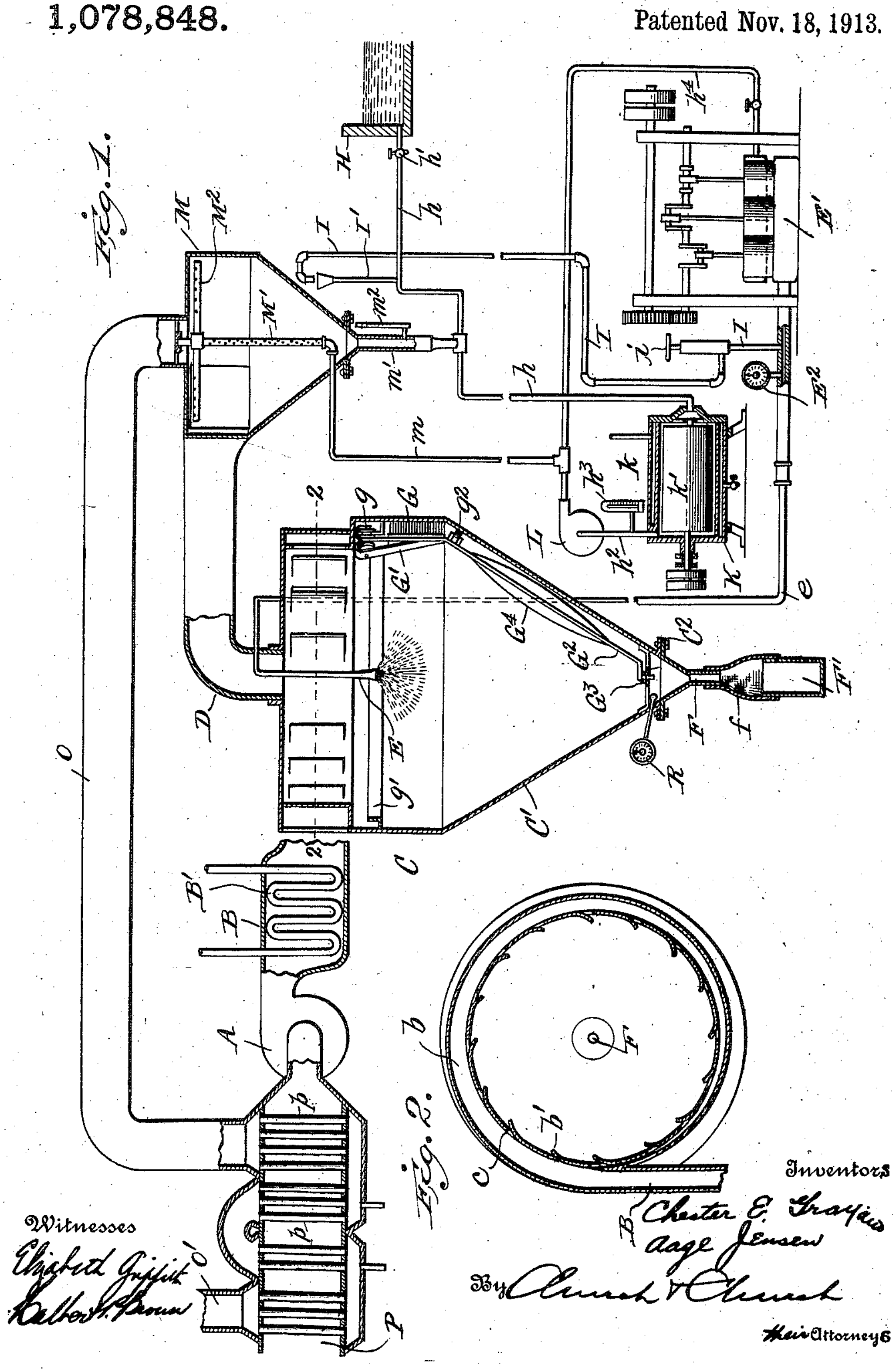

C. E. GRAY & A. JENSEN.

APPARATUS FOR DESICCATING LIQUIDS.

APPLICATION FILED DEC. 27, 1911.

1,078,848. Patented Nov. 18, 1913.

Witnesses

Elizabeth Griffith

Halbert L. Brown

Inventors

Chester E. Gray and

Aage Jensen

By Church & Church their Attorneys

UNITED STATES PATENT OFFICE.

CHESTER E. GRAY, OF EUREKA, AND AAGE JENSEN, OF OAKLAND, CALIFORNIA.

APPARATUS FOR DESICCATING LIQUIDS.

1,078,848. Specification of Letters Patent. Patented Nov. 18, 1913.

Application filed December 27, 1911. Serial No. 668,182.

*To all whom it may concern:*

Be it known that we, CHESTER E. GRAY and AAGE JENSEN, of Eureka, in the county of Humboldt and State of California, and Piedmont, Oakland, in the county of Alameda and State of California, respectively, have invented certain new and useful Improvements in Apparatus for Desiccating Liquids; and we do hereby declare the following to be a full, clear, and exact description of the same, reference being had to the accompanying drawings, forming part of this specification, and to the figures and letters of reference marked thereon.

This invention relates to apparatus for removing the solid constitutents of liquids in which they are held by suspension or solution, and is more especially designed for the production of milk powder which shall embody all of the solid constituents of milk, in such form that they may be redissolved in water for the reproduction of milk having the physical and chemical characteristics of the original milk, prior to its treatment.

In accordance with the present invention, and contrary to present practice in the commercial production of powdered milk, the milk is atomized and caused to travel from a cooler into and through a hotter zone of air which vaporizes and carries off the moisture content, the movement of the atomized material being secured by centrifugal force created by air currents moving in a circular path and having the hottest zone on the exterior. The apparatus may, therefore, be said to embody generally a chamber in which a cyclonic current of heated air is created, with means whereby the liquid is atomized in the vortex or at a point remote from the side walls, and the particles of atomized material caused to travel, by the centrifugal action created by the air currents, outwardly through the currents until arrested by the confining walls and directed thereby to a suitable discharge.

Referring to the accompanying drawings,—Figure 1 is a diagrammatic sectional view through an apparatus embodying the present improvements, no attempt being made to preserve the proportions of the parts, inasmuch as the proportions may be varied within wide limits, depending largely upon the desired capacity of the apparatus; certain of the parts are shown on an abnormal scale, inasmuch as in the apparatus they are relatively small and could not be illustrated clearly if in proper proportion for a commercial apparatus. Fig. 2 is a sectional view substantially in the horizontal plane indicated by the line 2—2 of Fig. 1.

Like letters of reference in both figures indicate the same parts.

In said drawings, the letter A indicates an air pump, which, as shown, may be of the centrifugal type and adapted to force a large volume of air through a conduit B within which there is arranged air heating means, such, for instance, as the manifold B′, through which steam may be circulated from any suitable source. The conduit B discharges into the upper end of a large chamber, preferably formed at the upper end with a substantially cylindrical wall C and with a downwardly tapering or conical lower portion C′ terminating at the lower end in a discharge duct for the solid constituents, as will be presently described. The air is discharged from the conduit B into the upper portion of the desiccating chamber C in a tangential direction and preferably through a series of vertically elongated openings *c*, Fig. 2, which may be conveniently formed in the inner wall of a gradually converging continuation *b* of the conduit B. As shown in Fig. 2, the inner wall of the converging continuation of the conduit B is provided with a series of inwardly turned projections *b′* forming the inner edges of the entrance apertures *c*, whereby each of the entering streams of air is directed tangentially into the desiccating chamber, in order to produce a substantially uniform air pressure around the whole periphery of the said chamber, and with a regular and uniform cyclonic or rotary movement. The air discharges from the desiccating chamber at the center of the top and is led away through a duct or conduit D. The atomizing or nebulizing nozzle E is arranged to discharge at substantially the center of the cylindrical portion of the chamber preferably in a downward and outward direction, or in a direction contrary to the upward direction of movement of the central column of air toward the air discharge duct D.

In operation it is found that with this construction of apparatus the highest temperature exists in proximity to the peripheral walls of the desiccating chamber, while the temperature at the center is very much lower. The atomized particles of the liquid to be desiccated are caused to travel by centrifugal action outwardly through the successively hotter portions of the whirling body of air by centrifugal force, and, therefore, in their progress from the nozzle they are subjected to gradually increasing heat and are finally arrested in their outward movement by the walls of the chamber in a completely dried and desiccated condition, in which condition they may be readily discharged from the apparatus by being allowed to flow downwardly by gravity into the lower portion of the chamber and out through a contracted discharge opening F into a suitable receiver F′, connection with which may be established by canvas or other flexible conduit *f*. The lower portion of the desiccating chamber is preferably made separable, as at $C^2$, to facilitate cleaning of the interior of the chamber, and in order to insure dislodgment of any particles which may adhere to the side walls of the chamber, a suitable traveling brush G is provided which, as illustrated, is supported by a carriage G′ having antifriction rollers *g* at the top running on a circular track *g′* in the chamber and with an antifriction roller $g^2$ at the bottom for holding the carriage in proper relation to the side walls of the chamber. This carriage is rotated by the action of the air currents, and is preferably provided with a downwardly extending projection or leg $G^2$, journaled at the lower end in a bearing $G^3$ arranged in the axis of the chamber and provided with an intermediate vane $G^4$ upon which the air currents may act for driving the carriage around the chamber whenever the apparatus is in operation.

The liquid milk is supplied to the atomizing nozzle E through a pipe *e* communicating with a high pressure pump E′ driven from any suitable source of power and designed not only to maintain a high and uniform pressure, but to deliver a quantity of milk in excess of that which can be discharged through the nozzle, the arrangement being such that the excess may be returned to the intake side of the pump through a suitable valve controlled by-pass and by observation of a pressure gage $E^2$, the by-pass valve may be regulated to insure a uniform pressure at the atomizing nozzle under all conditions of operation. The milk is supplied initially from a tank H through a pipe, *h*, which leads through connections, to be presently described, to the pump, said pipe having a regulating valve *h′* therein, and the by-pass indicated at I and having a regulating valve *i* therein leads up and discharges into a funnel or branch connection I′ communicating with the pipe *h*. The funnel branch I′ of the pipe *h* is preferably located above the normal liquid level of the tank H, and the discharge from the by-pass I is above the funnel, whereby the flow through the by-pass may be observed at all times, this being desirable in order to permit of a proper regulation of the apparatus, and in order to be sure that the apparatus is operating properly.

The milk supplied to the pump E′ is preferably preliminarily heated, and this may be primarily accomplished by leading the pipe *h* to a heater K, preferably consisting of a vessel having a steam jacket *k* and an internal rotary drum *k′* arranged centrally and serving to occupy a large proportion of the space within the vessel, whereby a comparatively thin layer of milk is uniformly exposed or brought into intimate contact with the heated vessel wall, the point of entry of the pipe *h* and the discharge from the vessel being at opposite ends. In the discharge pipe $h^2$ from the heater there is arranged a thermometer $h^3$ for observing the temperature of the milk, and while the pipe $h^2$ may lead directly to the intake of the pump E′, it preferably passes through a preliminary rotary or centrifugal pump L, and thence through pipe $h^4$ to the pump, there being a by-pass connection between the pipe $h^4$ and the pipe *h*, which permits of a certain portion of the milk being heated by the air escaping from the desiccating chamber.

The air escaping from the desiccating chamber, it is found in practice, is not loaded with moisture to its capacity at the temperature at which it escapes, and in order to prevent any loss through this source, the said air is caused to circulate in a second chamber M into which it discharges tangentially and from which it escapes centrally so as to set up a cyclonic action, and in this second chamber M there is arranged a spraying mechanism in communication with the by-pass from the pipe $h^4$. The by-pass is indicated in the drawing by the reference letter *m*, and it will be seen that it leads up into the chamber M and discharges therein through a vertically arranged spray pipe M′ and a horizontally arranged spray pipe $M^2$, the latter being mounted to rotate on the upper end of the pipe M′ and having its jet orifices directed upwardly and transversely, whereby the jets of milk will be projected against the upper surface of the chamber M and will, by their reaction in escaping from the jets, cause a rotary movement of the pipe $M^2$. From the conical bottom of the chamber M a discharge *m′* leads down and is in communication with the pipe *h* leading from the tank to the heater, whereby the liquid sprayed into the chamber M is returned to the supply pipe and is again circulated through the heater and either to the pump or back to the chamber M. A gage $m^2$ is mounted on one side of the pipe *m* and serves to indicate the liquid level in said pipe as well as in the by-pass inlet I′ and tank H.

In order to conserve the heat which might be lost through the free discharge of the moisture laden air from the chamber M and desiccating chamber, the said air is preferably carried through a duct O to a heater for the incoming air, and is thus used regeneratively. This heater may, as shown in the drawing, consist of a conduit P leading to the fan A and having a series of transverse tubes *p* therein through which the escaping air from the duct O passes, the arrangement being such that said air is caused to travel through the ducts in succession in a direction reverse to that of the flow of air in the conduit around the pipes and finally escapes at O′. This arrangement of regenerative heater, it is obvious, may be in accordance with any known form of such apparatus, although the form illustrated is preferred.

For observation during the operation of the apparatus, thermometers are preferably located at convenient points, as, for instance, in the bottom of the desiccating chamber, where a recording thermometer R is shown in Fig. 1, and by observation of which the proper regulation of the quantity of milk being atomized into the chamber may be readily determined and the heat regulated so that there can be no injury to the dried product.

In operation, power is supplied for operating the fan, pumps and drum in the milk heater. The high pressure pump E′ and pressure regulating valve are so controlled that the milk is delivered under extremely high pressure from the vaporizing nozzle. Progressively as the vaporized product travels outwardly from the vortex of the air in the desiccating chamber it is relieved of its moisture content and travels into zones of air which are of higher and higher temperature, inasmuch as practice shows that the highest temperature of the air in the desiccating chamber is at the periphery and that said temperature progressively decreases toward the vortex and exit.

Having thus described our invention, what we claim as new and desire to secure by Letters Patent of the United States, is:—

1. An apparatus for recovering the constituent solids of liquids, embodying a desiccating chamber having a converging bottom with a discharge therein for desiccated material, means for introducing heated air tangentially into said chamber and withdrawing the same centrally, whereby cyclonic currents are set up in the chamber, and means for atomizing the liquid into the chamber at a point remote from its side walls and in proximity to the air exit.

2. An apparatus for removing the constituent solids of liquids, embodying a desiccating chamber, means for introducing heated air tangentially into said chamber and withdrawing the same centrally, whereby cyclonic currents of air are set up in the chamber, and means for atomizing the liquid into the vortex in proximity to and in a direction away from the air exit from the chamber.

3. An apparatus for recovering the constituent solids of liquids, embodying a desiccating chamber having side walls converging toward the bottom, means for introducing heated air tangentially into the upper portion of said chamber and for withdrawing the air centrally from the upper portion of the chamber, whereby cyclonic currents are set up in the chamber, a discharge duct for the collected solid material at the bottom of the chamber, and a downwardly directed atomizing nozzle located in the upper portion of the chamber at a point remote from the walls of the chamber, whereby the atomized material is forced to traverse the air currents before coming in contact with the walls of the chamber.

4. An apparatus for recovering the constituent solids of liquids, embodying a desiccating chamber having a circularly disposed air duct at its upper end with tangentially arranged air inlet openings between said duct and chamber, means for forcing heated air into said duct and chamber whereby cyclonic currents are set up in the chamber, an air discharge duct arranged centrally of the upper portion of the chamber, a discharge duct for the solid matter at the bottom of the chamber, and means for atomizing liquid into the upper portion of the chamber.

5. An apparatus for recovering the constituent solids of liquids, embodying a desiccating chamber having tangentially arranged air inlets and a centrally arranged air discharge at the top and a discharge for the solid matter at the bottom, an air heating means in communication with the tangential air inlets, an atomizing nozzle within the chamber below the air discharge and remote from the side walls of the chamber, and movable means within the chamber for dislodging accumulations of material on the walls.

6. An apparatus for recovering the constituent solids of liquids, embodying a desiccating chamber, means for introducing heated air into said chamber, means for introducing atomized liquid into the chamber remote from the side walls thereof and for withdrawing the collected solid matter from the chamber, and a rotary brush mounted within the chamber for dislodging accumulations on the walls of the chamber.

7. In an apparatus for recovering the constituent solids of liquid in the form of a dry powder, the combination with a desiccating chamber, means for introducing heated air tangentially therein, whereby cyclonic currents are set up in the chamber, a second chamber, and a discharge duct leading from the first mentioned chamber and discharging tangentially into said second chamber, of means for spraying liquid into said second chamber, and means for atomizing the sprayed liquid in the first mentioned chamber and for withdrawing the collected solid constituents of the liquid.

8. In an apparatus for recovering the constituent solids of liquids in the form of a dry powder, the combination with a desiccating chamber having air entrance and exit openings arranged to produce cyclonic currents within the chamber, an air forcing and heating means in communication with the air inlet openings of the chamber, and an atomizing nozzle for the liquids arranged within the chamber and remote from its side walls, of a second chamber having a tangentially arranged air inlet opening in communication with the discharge from the first mentioned chamber, means for spraying liquid into said second chamber, and means for conveying the sprayed liquid from said second chamber to the said atomizing nozzle.

9. In an apparatus for recovering the constituent solids of liquids in the form of a dry powder, the combination of a conical desiccating chamber having tangentially arranged air inlets at the top with a central air discharge at the top and a discharge for the solid matter at the bottom, an atomizing nozzle within and remote from the side walls of the chamber, and an air forcing and heating means in communication with the air inlet openings.

10. In an apparatus for recovering the constituent solids of liquids in the form of a dry powder, the combination with a desiccating chamber having a tangential air inlet, an atomizing nozzle within said chamber in proximity to the air exit, and air forcing and heating means communicating with the chamber, of an air discharge duct leading from the center of the chamber, and an air heater through which the air discharged from the chamber is conducted, said air heater being in communication with the air forcing and heating means, whereby the heat of the air discharged from the desiccating chamber is used regeneratively.

11. In an apparatus for recovering the constituent solids of liquids in the form of a dry powder, the combination with a desiccating chamber, means for atomizing liquid centrally into said chamber and for forcing heated air into the chamber tangentially at the side, of a second chamber into which the air from the desiccating chamber is discharged, a liquid spraying device in said second chamber, a liquid heater in communication with said spraying device, whereby the sprayed liquid is heated to prevent condensation of the moisture in the air discharged from the desiccating chamber, and a duct for conducting the sprayed liquid to the atomizing means.

12. In an apparatus for recovering the constituent solids of liquids in the form of a dry powder, the combination with a conical desiccating chamber having a discharge at the bottom for the solid material, and a central discharge at the top for the moisture laden air, an air supply duct of gradually decreasing area extending around the upper portion of the chamber and having a plurality of tangentially arranged air inlet openings, of means for supplying heated air under pressure to said duct, an atomizing nozzle arranged within the chamber, and means for supplying liquid to said atomizing nozzle, substantially as described.

CHESTER E. GRAY.
AAGE JENSEN.

Witnesses:
M. ENGLES,
D. W. HANSON.